May 1, 1956 G. E. BRIGGS 2,743,884

FISH TAPE THREADER

Filed Aug. 25, 1953

George E. Briggs
INVENTOR.

BY Clarence A. O'Brien
and Harvey B. Jacobson
Attorneys

United States Patent Office 2,743,884

Patented May 1, 1956

2,743,884

FISH TAPE THREADER

George E. Briggs, Palo Alto, Calif.

Application August 25, 1953, Serial No. 376,413

2 Claims. (Cl. 242—96)

The present invention relates to an electrician's fish tape reel and more particularly relates to a fish tape threaded for guiding the tape onto the reel as the tape is withdrawn from a conduit.

The primary object of the invention is to provide a fish tape threader which is slidably mounted between the reel flanges to guide the fish tape onto the reel without injury to the workmen's hands.

An important object of the invention is to provide a fish tape threader that will not interfere with the normal operation of the fish tape reel and which will in no manner interfere with the unwinding of the tape from the reel.

Yet another object of the invention is to provide a fish tape threader which is extremely simple of construction, that may be quickly and simply attached to a conventional fish tape reel and which will quicken the process of winding the tape on the reel.

These, together with various ancillary objects and features which will later become apparent as the following description proceeds are attained by the present invention, a preferred embodiment of which is shown by way of example only in the accompanying drawings wherein.

Figures 1, 2, 3:
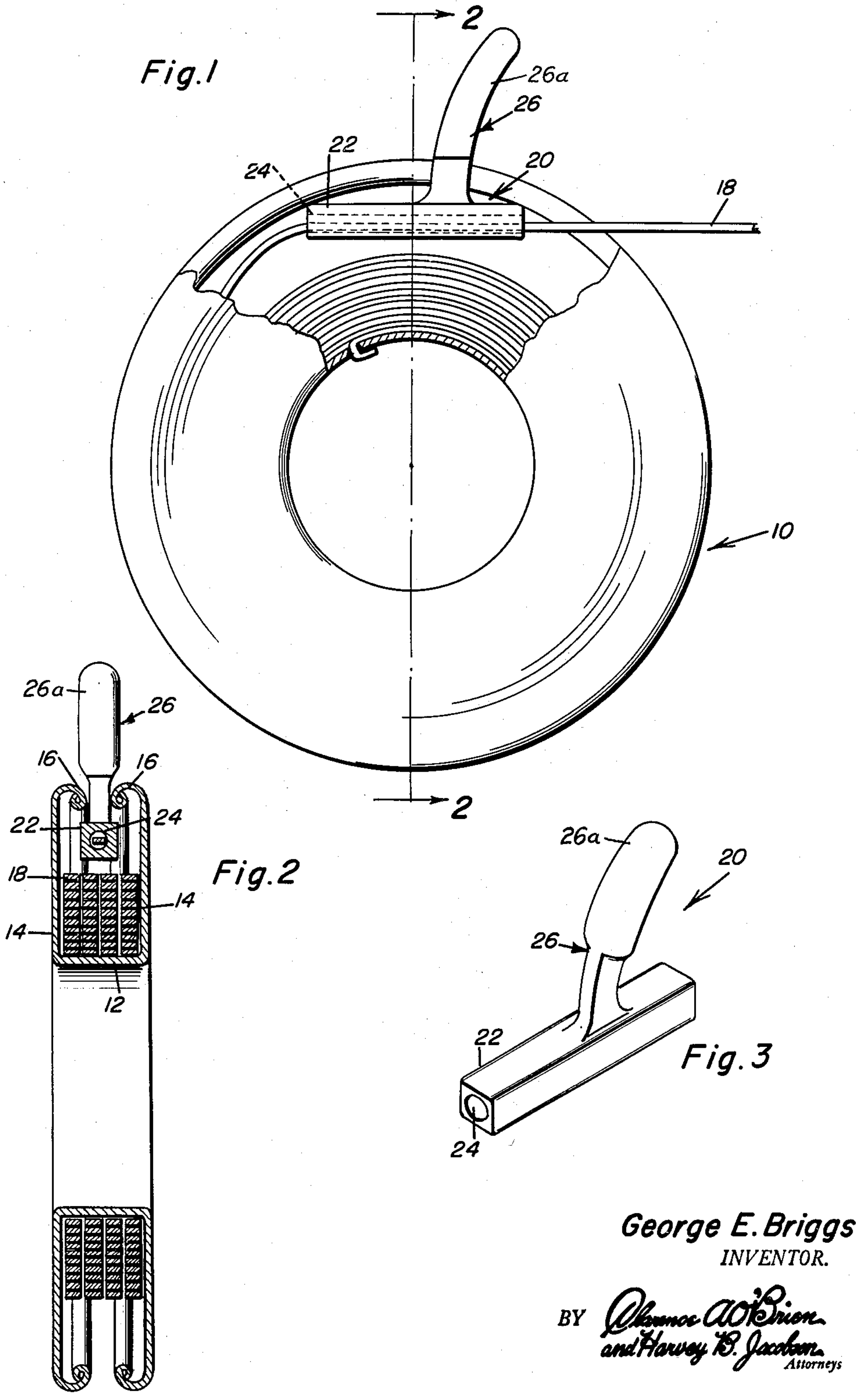
Figure 1 is a side elevational view of a fish tape reel with a tape wound thereon with parts being broken away to disclose the mounting of the fish tape threader constituting the present invention on the reel.
Figure 2 is a cross sectional view of the reel with the threader mounted thereon taken substantially along the plane of section 2—2 of Figure 1.
Figure 3 is a perspective view of the fish taper threader per se.

Referring now to the accompanying drawing in detail, wherein like reference numerals refer to similar parts throughout the various views, attention is first directed to Figures 1 and 2 wherein a fish tape reel is designated in its entirety by the numeral 10.

The reel 10 comprises essentially a central spool 12, with annular guide flanges 14 integrally or otherwise connected thereto. The peripheral edges of the guide flanges 14 are inwardly beaded as at 16 to form opposite spaced apart, annular, rounded edges.

A fish tape, preferably in strip form, 18, usually of metal possessing a high tensile strength somewhat analogous to "piano" wire is wound upon the spool 12 of the reel and guided between the guide flanges 14 thereof.

The usual manner of operating this reel to wind and unwind the tape 18 therefrom is to pull the fish tape tangentially away from the reel while rolling the reel away from the body (in a clockwise direction, as shown in Figure 1) to reel out the tape. To wind in the tape, the reel is wound toward the body (in a counter-clockwise direction with respect to Figure 1), building the tape onto the reel with the heel of the hand.

This process of winding the tape 18 on a reel 10 is a laborious one and necessitates guiding the tape 18 between the reel flanges with the heel of the hand which results in hand cuts and abrasions.

The present invention constitutes a tape threader designated in its entirety by the numeral 20 which will automatically guide the tape 18 onto the reel 10 without exposing the hand to injury and which will enable the tape to be wound upon the reel much quicker and more efficiently than with a hand guiding operation.

Referring particularly to Figure 3, the threader 20 will most clearly be observed. This threader constitutes essentially an elongated bar of polygonal cross section and designated by the numeral 22. Although the bar 22 is shown as being square in cross section in the preferred embodiment of the invention, it is to be understood that it could be hexagonal or of other polygonal shapes as well as circular without departing from the spirit of the invention. A longitudinal passage in the form of a bore 24 is formed within the bar 22 and intermediate the ends of the bar 22 is an upstanding handle 26.

In the embodiment shown, the bar 22 is wider than the space between said edges 16 and is inserted between the guide flanges 14 of the reel and within the confines of said edges 16 and held slidably in the reel between the guide flanges by the inwardly beaded peripheral edges 16 of these flanges. A handle 26 on the bar 22 projects radially outwardly from between the flanges 14 of the reel 10 through the spaces between said edges 16 for a purpose that will become immediately apparent. The handle 26 has an enlarged portion *26a* extending out of the reel 10 and being wider than the space between said edges 16 to prevent said handle and the bar 22 from falling in the reel 10.

In the operation of the reel 10 with the threader 20 attached thereto, the end of the tape 18 is first guided through the passage 24 in the threader 20 during its passage into a conduit. Since the ends of the threader 20 will at all times contact the edges of the inwardly beaded portions 16 of the side flanges 14, the elongated bar 22 will in effect form a chord within the reel to guide the tape 18 tangentially from the reel.

In operation, to wind the tape 18 upon the reel 10, the handle 26 is grasped to retain the threader 20 in one position while the reel 10 is wound in a counter-clockwise direction. Thus, by the slidable reception of the bar 22 between the flanges 14 of the reel 10, the tape 18 is automatically guided onto the spool 12 without the necessity for utilizing the heel of the hand for this purpose and greatly increasing the speed with which the tape 18 may be rewound upon the reel 10.

If desired, the threader 20 may be utilized as a separate member apart from the reel 10 and not physically attached thereto. When the spreader 20 is so utilized, it is simply held adjacent the reel 10 by one hand while the tape 18 passes therethrough as the reel is wound in the customary manner. In either method of use the threader 20 serves admirably to quicken the process of rewinding the tape upon the reel and obviates injury to the hand of the workman from such rewinding.

When the threader 20 is detached from the reel, it obviously will not restrain the unwinding of the tape from the reel in any manner. Also, when the tape threader 20 is mounted upon the reel, as shown in the preferred embodiment, it likewise will not interfere with the customary operation of the tape either in unwinding or winding the same upon the reel since by virtue of its sliding attachment between the flanges 14, the reel may still be reeled in a clockwise direction while the end of the tape 18 is pulled away from the workman in the unwinding operation in the customary manner.

From the foregoing description, the construction and operation of the invention are believed to be readily apparent. However, since numerous modifications and changes will readily occur to those skilled in the art after a careful consideration of the foregoing specification taken in conjunction with the accompanying drawings, it is not desired to limit the invention to the exact construction shown and described. But all suitable modifications may be resorted to which fall within the scope of the appended claims.

What is claimed as new is as follows:

1. In combination with an electrician's fish tape reel having peripheral guide flanges including opposite, annular, spaced apart, beaded edges between said flanges, a tape threader slidably disposed between said guide flanges for guiding a tape tangentially from and onto said reel, said threader comprising an elongated bar seating chordally between said flanges within the confines of said beaded edges and having a longitudinal passage therethrough for guiding the fish tape onto the reel, said bar being wider than the space between said beaded edges so that said edges retain the bar in the reel.

2. In combination with an electrician's fish tape reel having peripheral side flanges including opposite, annular, spaced apart, beaded edges between said flanges, a tape threader slidably disposed between said side flanges for guiding a tape tangentially from and onto said reel, said threader comprising an elongated bar seating chordally between said flanges within the confines of said beaded edges and having a longitudinal passage therethrough for guiding the fish tape onto the reel, said bar being wider than the space between said edges so that said edges retain the bar in the reel, and a handle projecting upwardly from said bar through said space and having an enlarged portion disposed exteriorly of said reel wider than said space to prevent said bar and handle from falling in the reel.

References Cited in the file of this patent

UNITED STATES PATENTS

| | | |
|---|---|---|
| 426,196 | Munsie | Apr. 22, 1890 |
| 1,516,331 | Catlett et al. | Nov. 18, 1924 |
| 1,815,433 | Dunagan | July 21, 1931 |
| 1,844,433 | Markowitz | Feb. 9, 1932 |
| 1,890,945 | Hormel | Dec. 13, 1932 |
| 2,534,472 | Norvelle | Dec. 19, 1950 |
| 2,556,484 | Raney | June 12, 1951 |
| 2,600,722 | Atkinson | June 17, 1952 |
| 2,609,877 | Hannington | Sept. 9, 1952 |
| 2,611,581 | Hannant | Sept. 23, 1952 |
| 2,689,709 | Waldschmidt | Sept. 21, 1954 |